United States Patent
Buethe et al.

(10) Patent No.: US 11,535,365 B2
(45) Date of Patent: Dec. 27, 2022

(54) AIRCRAFT LANDING WITH ELEVATOR DOWN FORCE ASSISTANCE DURING BRAKING

(71) Applicant: Gulfstream Aerospace Corporation, Savannah, GA (US)

(72) Inventors: Scott Buethe, Savannah, GA (US); Thomas Landers, Savannah, GA (US); Alex Rummel, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 397 days.

(21) Appl. No.: 16/736,088

(22) Filed: Jan. 7, 2020

(65) Prior Publication Data
US 2021/0206475 A1 Jul. 8, 2021

(51) Int. Cl.
| | |
|---|---|
| *B64C 13/16* | (2006.01) |
| *B64C 25/42* | (2006.01) |
| *B64C 9/00* | (2006.01) |
| *B64C 25/36* | (2006.01) |

(52) U.S. Cl.
CPC .............. *B64C 13/16* (2013.01); *B64C 9/00* (2013.01); *B64C 25/36* (2013.01); *B64C 25/42* (2013.01)

(58) Field of Classification Search
CPC ........... B64C 13/16; B64C 9/00; B64C 25/36; B64C 25/42; B64C 25/426; Y02T 50/40
See application file for complete search history.

(56) References Cited

U.S. PATENT DOCUMENTS

| | | | |
|---|---|---|---|
| 4,007,970 A * | 2/1977 | Romero | ................ B60T 8/1703 303/20 |
| 2017/0137144 A1 * | 5/2017 | Georgin | .................. B60T 8/171 |
| 2018/0015997 A1 * | 1/2018 | Zambrano | ............... B60T 8/325 |

FOREIGN PATENT DOCUMENTS

WO WO-8503367 A * 8/1985 ........... B64C 25/426

* cited by examiner

*Primary Examiner* — Assres H Woldemaryam
(74) *Attorney, Agent, or Firm* — LKGlobal | Lorenz & Kopf, LLP

(57) ABSTRACT

An aircraft includes a processor, an airframe, a pitch attitude flight control surface coupled with the airframe, a nose wheel coupled with the airframe, main wheels coupled with the airframe, and a brake system coupled with the main wheels. The processor is programmed to determine that the aircraft has entered a braking segment of a landing phase of a flight of the aircraft while the aircraft is on a ground surface and to command the pitch attitude flight control surface with a nose up command during the braking segment in response to determining that the aircraft has entered the braking segment. The nose up command causes the pitch attitude flight control surface to generate a downforce that increases traction between the main wheels and the ground surface due to a weight shift from the nose wheel to the main wheels and directly due to the downforce on the main wheels.

17 Claims, 3 Drawing Sheets

AIRCRAFT LANDING WITH ELEVATOR DOWN FORCE ASSISTANCE DURING BRAKING

TECHNICAL FIELD

The present disclosure generally relates to aircraft avionics programmed to assist with braking during landing of the aircraft, and more particularly relates to avionics and flight control systems that apply down force to the aircraft using the elevator during braking.

BACKGROUND

Aircraft are equipped with wheel brakes to slow the aircraft while the aircraft is traveling on the ground. The wheel brakes are typically designed to provide more braking power than can be transmitted between the landing gear tires and the runway surface. For example, anti-lock brake functions are typically implemented to reduce the amount of braking applied when the wheels are at risk of becoming locked and sliding across the ground surface.

The power that can be transmitted between the wheels and the ground surface depends on the environmental conditions, tire properties, ground condition, the normal force on the tires, and other factors. The braking ability of the aircraft may be significantly reduced in wet conditions, in snowy conditions, or when loose gravel or other debris is present on the runway. Reduced braking ability may create difficulties landing the aircraft on short runways or when landing at high speeds.

Many conventional aircraft have what is known as tricycle landing gear. Tricycle landing gear aircraft have a nose gear assembly extending below the front of the aircraft and have a pair of main gear assemblies extending down slightly aft of a center of gravity of the aircraft. These tricycle gear aircraft commonly include braking systems on the main landing gear wheels, but do not typically include braking systems on the nose landing gear wheels. Dynamic loading weight shift from the main gear assemblies to the nose gear assembly during heavy braking reduces the normal force on the braking (main landing gear) wheels. Because the normal force on the braking wheels is a major factor in the braking force the braking wheels are capable of delivering to the ground surface, such heavy braking reduces the tractive ability and braking capacity of the main wheels.

Accordingly, it is desirable to provide methods, systems, and aircraft that permit increased traction for more power transfer between the tires and the runway during braking. Furthermore, other desirable features and characteristics of the present disclosure will become apparent from the subsequent detailed description and the appended claims, taken in conjunction with the accompanying drawings and the foregoing technical field and background.

SUMMARY

In general, the embodiments provided herein command the aircraft to automatically apply a "nose up" elevator command during a braking segment of an aircraft stop. The nose up elevator command produces additional down force at the rear of the aircraft. The down force directly applies a downforce on the landing gear wheels as well as shifts some aircraft weight from the nose gear wheels to the main wheels. Accordingly, the normal force on the landing gear wheels may be increased and the traction between the landing gear (braking) wheels and the runway may be increased. The increased traction permits more power to be transmitted between the wheels and the runway to improve braking ability and shorten the stopping distance during the braking segment. A shortened stopping distance permits the aircraft to land on shorter runways.

In a first non-limiting example, an avionics system includes a processor. The avionics system is for an aircraft that includes an airframe, a pitch attitude flight control surface coupled with the airframe, a nose wheel coupled with the airframe, main wheels coupled with the airframe, and a brake system operatively coupled with the main wheels. The processor is programmed to determine that the aircraft has entered a braking segment of a landing phase of a flight of the aircraft while the aircraft is on a ground surface and to command the pitch attitude flight control surface with a nose up command during the braking segment in response to determining that the aircraft has entered the braking segment. The nose up command causes the pitch attitude flight control surface to generate a downforce that increases traction between the main wheels and the ground surface due to a weight shift from the nose wheel to the main wheels and directly due to the downforce on the main wheels.

In a second non-limiting example, an aircraft includes an airframe, a pitch attitude flight control surface, main wheels, a nose wheel, a brake system, and a processor. The pitch attitude flight control surface is coupled with the airframe. The main wheels are coupled with the airframe. The nose wheel is coupled with the airframe. The brake system is operatively coupled with the main wheels. The processor is programmed to determine that the aircraft has entered a braking segment of a landing phase of a flight of the aircraft while the aircraft is on a ground surface and to command the pitch attitude flight control surface with a nose up command during the braking segment in response to determining that the aircraft has entered the braking segment. The nose up command causes the pitch attitude flight control surface to generate a downforce that increases traction between the main wheels and the ground surface due to a weight shift from the nose wheel to the main wheels and directly due to the downforce on the main wheels.

In a third non-limiting example, a method of increasing braking traction during a braking segment of a landing phase of a flight of an aircraft is provided. The method includes determining that the aircraft has entered the braking segment of the landing phase of the flight while the aircraft is on a ground surface. The method further includes commanding a pitch attitude flight control surface of the aircraft with a nose up command during the braking segment in response to determining that the aircraft has entered the braking segment. The nose up command causes the pitch attitude flight control surface to generate a downforce that increases traction between main wheels of the aircraft and the ground surface due to a weight shift from a nose wheel of the aircraft to the main wheels and directly due to the downforce on the main wheels.

BRIEF DESCRIPTION OF THE DRAWINGS

Advantages of the present disclosure will be readily appreciated, as the same becomes better understood by reference to the following detailed description when considered in connection with the accompanying drawings wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
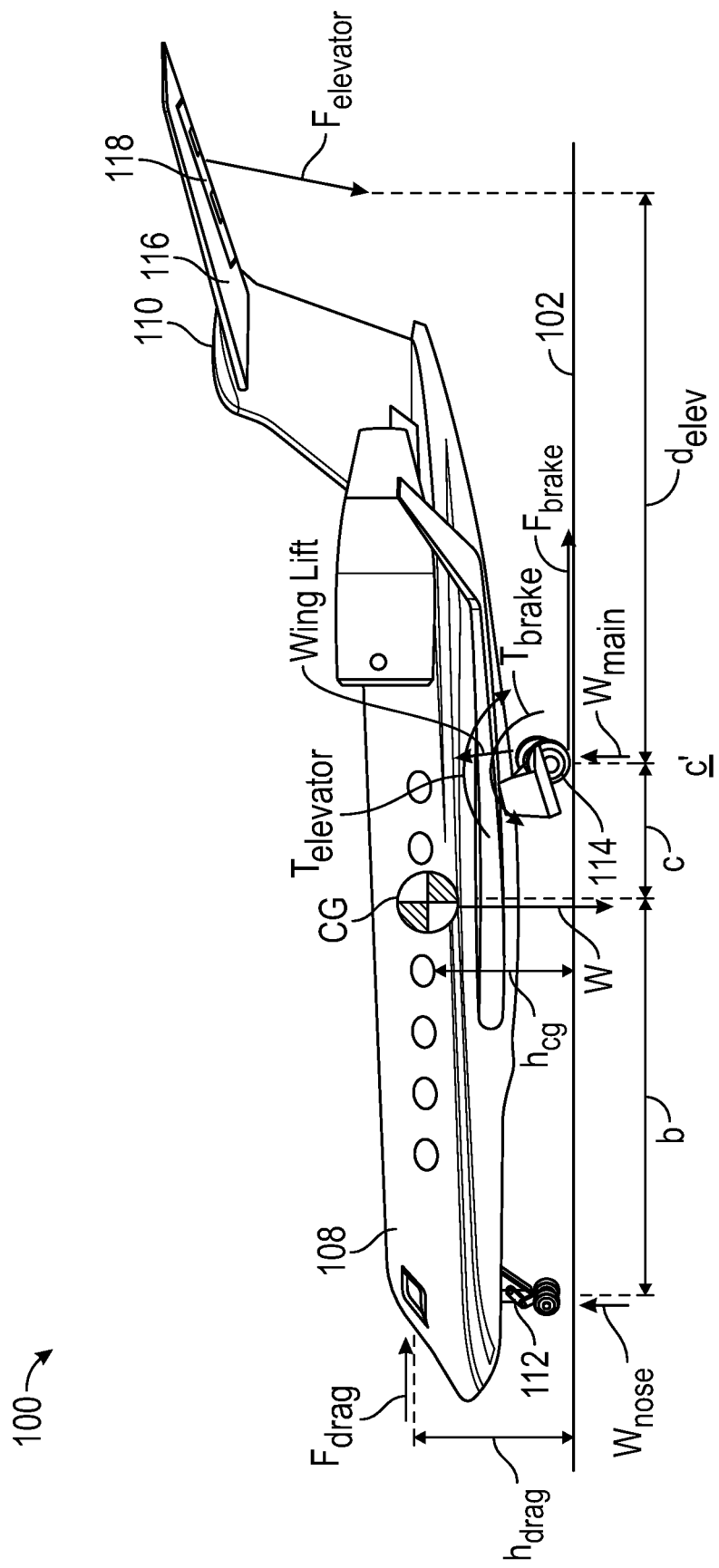
FIG. 1 is a schematic diagram illustrating an aircraft during a braking segment of a landing phase of a flight, in accordance with various embodiments.

Referring now to FIG. 1, an example of an aircraft 100 is illustrated during a braking segment of a landing phase of a flight on a ground surface 102 in accordance with some embodiments. Various forces acting on aircraft 100 are shown to help illustrate the benefits and operation of the systems and methods described herein.

A weight (W) of aircraft 100 applies towards the center of Earth at the center of gravity (CG) of aircraft 100. As will be appreciated by those with ordinary skill in the art, the location of CG depends on the shape of aircraft 100 and the placement of cargo, fuel, and other objects loaded onto aircraft 100. An aerodynamic drag force (Fdrag) acts substantially opposite forward movement of aircraft 100, an elevator downforce (Felevator) acts downward on a tail 110 of aircraft 100 when the elevator is commanded with a "nose up" command, and a wheel braking force (Fbrake) is applied during braking against movement of aircraft 100 when a braking system of aircraft 100 is engaged.

The sum of torques acting on aircraft 100 about a given axis is equal to the product of the rotational moment of inertia and the rotational acceleration about the given axis. Newton's second law may be applied by drawing a boundary around the body of interest and substituting the appropriate forces and/or moments at each point of contact to form a free body diagram. The torque acting at the main wheels causing aircraft 100 to shift weight to the nose wheel is represented as Tbrake. The value of Tbrake depends largely on Fbrake and CG, among other factors. Televator acts counter to Tbrake, and depends largely on Felevator and Fdrag.

The dynamic loading due to deceleration causes the weight carried by the nose wheel (Wnose) to increase under deceleration while the weight carried by the main wheels (Wmain) decreases due to the same deceleration. Because there are typically not brakes located on the nose wheel, weight shift to the nose is detrimental to braking capacity and the maximum tractive force between the main (braking) wheels and the ground surface. When acting on level ground, Wmain may be approximated according to eq. 1:

$$Wmain = W + Felev(delev + b + c) - \frac{W * ax * hcg}{g} + Fdrag * hdrag - WingLift, \quad (eq.\ 1)$$

where W is the static weight of aircraft 100, Felev is the downforce applied by the pitch control surfaces (e.g., elevator) of aircraft 100, delev is the horizontal distance between the main wheels and the elevator, b is the horizontal distance between the nose wheel and CG, c is the horizontal distance between CG and the main wheels, ax is the deceleration due to braking, hcg is the height of CG, Fdrag is the sum of aerodynamic drag forces, and hdrag is the height of Fdrag. WingLift is the lifting force of the main wings as it acts at the main wheels.

As can be seen by eq. 1, higher levels of braking deceleration decreases the weight carried by the main wheels, while increasing Felev increases the weight carried by the main wheels. The maximum braking force (Fbrakemax) that may be applied by the main wheels is given by eq. 2:

$$Fbrakemax = \mu * Wmain \quad (eq.\ 2),$$

where $\mu$ is the peak coefficient of friction between the main wheels and the ground surface. Attempts to apply brakes to achieve braking force larger than Fbrakemax will result in lockup of the main wheels and engagement of the anti-lock braking systems (if installed). As can be seen in eq. 2, increasing Wmain results in a larger braking force that may be applied resulting in an increased braking capacity and shorter stopping distances for aircraft 100.

Figure 2:
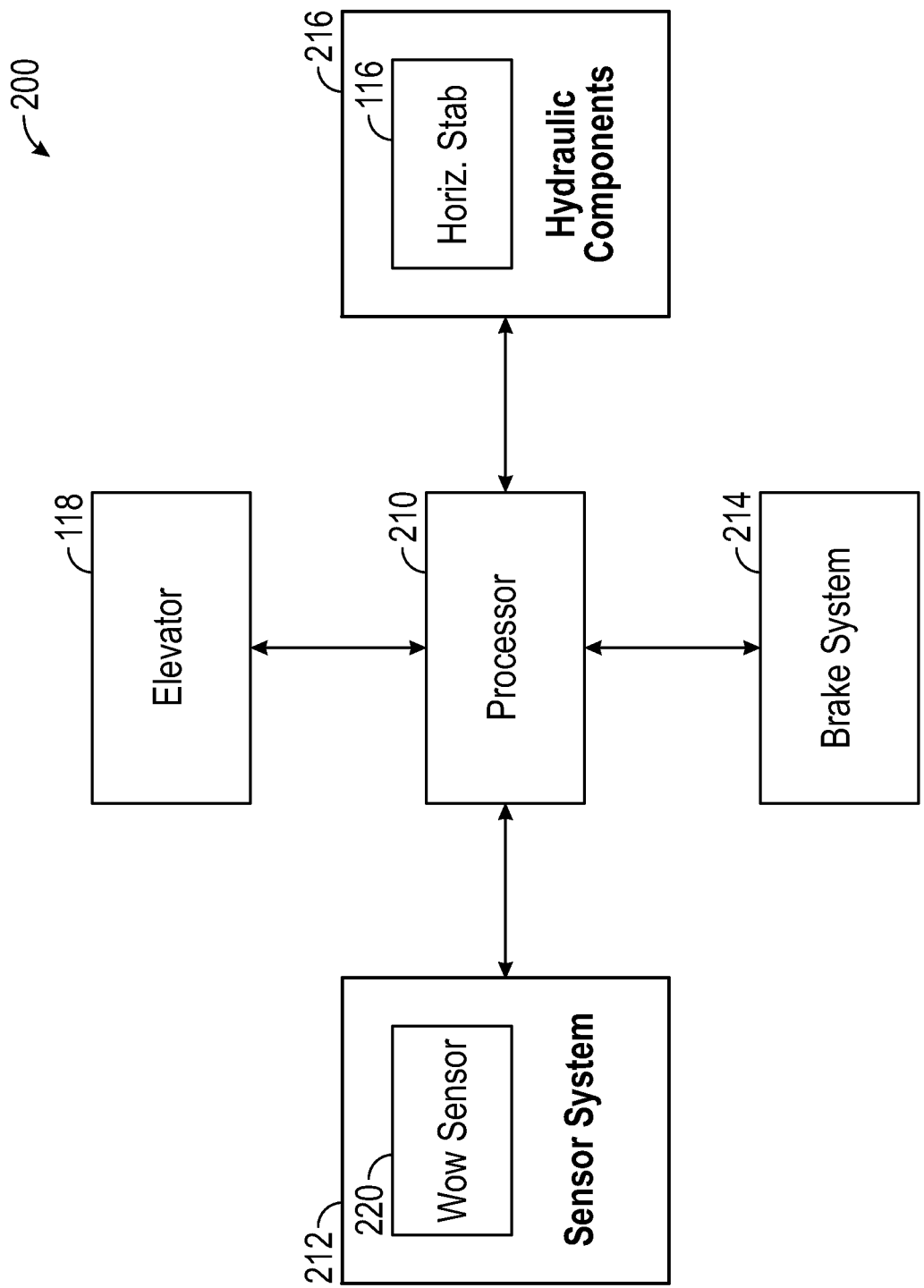
FIG. 2 is a simplified block diagram of a control system of the aircraft of FIG. 1, in accordance with various embodiments.

Referring now to FIG. 2, and with continued reference to FIG. 1, a control system 200 of aircraft 100 is illustrated in accordance with some embodiments. Aircraft 100 includes an airframe 108, a tail 110, a nose landing gear assembly 112, main landing gear assemblies with main wheels 114, a horizontal stabilizer 116, an elevator 118, and control system 200. Horizontal stabilizer 116 and elevator 118 are pitch attitude flight control surfaces by which aircraft 100 may apply Felev to change a pitch attitude of aircraft 100 during flight.

Control system 200 includes a processor 210, a sensor system 212, a brake system 214, and a hydraulic system 216. In the example provided, control system 200 has elements from what are traditionally avionics and flight control systems. Processor 210 is a computer (or group of computers) programmed to perform the method described below. In some embodiments, processor 210 may be replaced with a suitable electronic circuit, mechanical circuit, hydraulic circuit, or other control means that cause elevator 118 and/or horizontal stabilizer 116 to provide the downforce while brake system 214 is engaged.

In the example provided, processor 210 includes a non-transitory computer readable storage device or medium for storing instructions for performing the method described below. The processor may be any custom made or commercially available processor, a central processing unit (CPU), a graphics processing unit (GPU), an auxiliary processor among several processors associated with control system 200, a semiconductor based microprocessor (in the form of a microchip or chip set), a macroprocessor, any combination thereof, or generally any device for executing instructions. The computer readable storage device or medium may include volatile and nonvolatile storage in read-only memory (ROM), random-access memory (RAM), and keep-alive memory (KAM), for example. The computer-readable storage device or medium may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by control system 200 in controlling aircraft 100.

The instructions may include one or more separate programs, each of which comprises an ordered listing of executable instructions for implementing logical functions. The instructions, when executed by the processor, receive and process signals from the sensor system, perform logic, calculations, methods and/or algorithms for automatically controlling the components of aircraft 100, and generate control signals to automatically control the components of aircraft 100 based on the logic, calculations, methods, and/or algorithms. Although only one control system 200 is illustrated, embodiments of aircraft 100 may include any number of control systems that communicate over any suitable communication medium or a combination of communication media and that cooperate to process the sensor signals, perform logic, calculations, methods, and/or algorithms, and generate control signals to automatically control features of aircraft 100. As used herein, the term "programmed to" means that the instructions for performing an algorithm are stored in a non-transitory medium of the programmed component.

Sensor system 212 generates sensor outputs that indicate when aircraft 100 has entered a braking segment of a landing phase of a flight of aircraft 100. A landing phase is a portion of an aircraft flight where the aircraft touches down on ground surface 102 and comes to a stop or a speed at which aircraft 100 may taxi at relatively low speeds on ground surface 102. As used herein, the term "braking segment" means the portion of the landing phase after the aircraft has touched down on the ground surface and during which the wheel brakes are applied to reduce the speed of the aircraft. In the example provided, sensor system 212 includes weight on wheels sensor 220 to help determine when the aircraft has entered the braking segment. Sensor system 212 may also include acceleration sensors, pitch attitude sensors (e.g., inertial navigation units), airspeed sensors, ground speed sensors, Global Navigation Satellite Systems, and other systems whose output may be used to confirm or separately determine whether aircraft 100 is in the braking segment.

Brake system 214 includes wheel brakes operatively coupled with main wheels 114 to selectively brake the main wheels, resulting in Fbrake. Hydraulic system 216 actuates various components on aircraft 100, such as a hydraulic actuator coupled with horizontal stabilizer 116.

Figure 3:
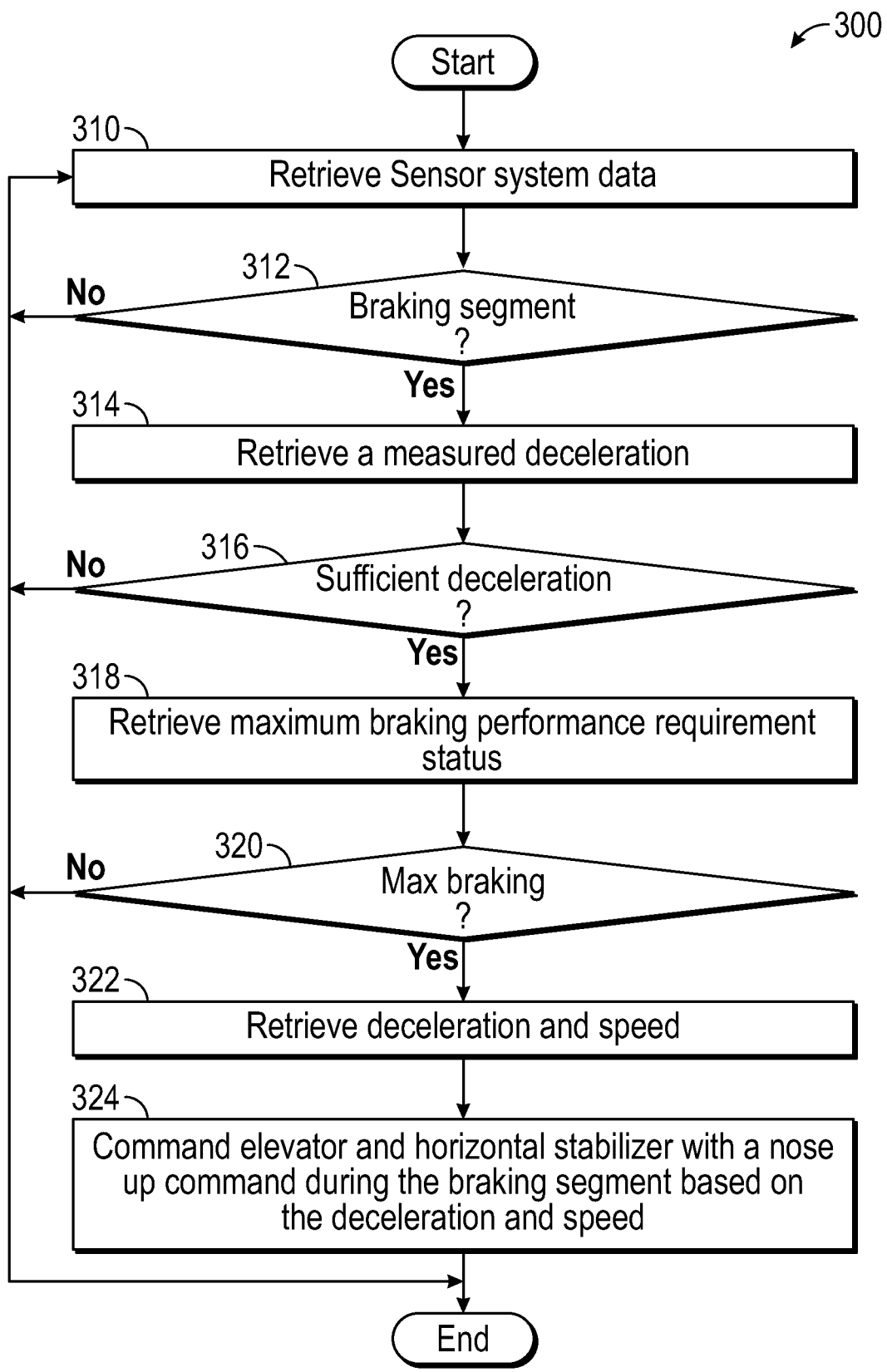
FIG. 3 is a flow chart illustrating a method programmed into the control system of FIG. 2 in accordance with various embodiments.

Referring now to FIG. 3, and with continued reference to FIGS. 1-2, a method 300 of increasing braking capability of an aircraft is illustrated. In the example provided, tasks of method 300 are performed by control system 200 and processor 210.

Task 310 retrieves sensor system data. In the example provided, processor 210 retrieves sensor data from weight on wheels sensor 220 indicating when main wheels 114 have touched down on ground surface 102.

Task 312 determines whether the aircraft has entered a braking segment of a landing phase of a flight of the aircraft while the aircraft is on a ground surface. In the example provided, processor 210 determines that aircraft 100 has entered the braking segment based on sensor outputs of weight on wheels sensor 220 of sensor system 212. In some embodiments, processor 210 may confirm that the pitch attitude of aircraft 100 and satellite navigation information agree that aircraft 100 has entered the braking segment. When the aircraft has not entered the braking segment, method 300 ends. When the aircraft has entered the braking segment, method 300 proceeds to task 314.

Task 314 retrieves the measured deceleration of the aircraft. The measured deceleration includes contributions from the braking (Fbrake), drag (Fdrag), and any deceleration created by a thrust reversing system.

Task 316 determines whether sufficient deceleration from braking is applied such that Tbrake is of sufficient magnitude that down force from the tail can be applied. In the example provided, processor 210 only applies the downforce with elevator 118 when the measured deceleration is above a target threshold and the thrust reversers have not been commanded to deploy. When those criteria are no longer satisfied, method 300 ends. When the measured deceleration is above a target threshold and the thrust reversers have not been commanded to deploy, method 300 proceeds to task 318.

Task 318 retrieves a maximum performance requirement status indicating when increased brake system capability is available. Increased brake system capability is desirable when processor 210 determines aircraft 100 is decelerating at a high magnitude due to a high level of braking.

Task 320 determines whether the maximum performance requirement status indicates that increased brake system capability is available. When increased brake system capability is not available, then method 300 ends. When increased brake system capability is available, then method proceeds to task 322. Accordingly, in the example provided, the processor is programmed to command the nose up command only when the maximum performance requirement status indicates maximum performance braking is available.

Task 322 retrieves a deceleration and a speed of the aircraft. For example, processor 210 may retrieve the deceleration (ax) and speed from sensor system 212. Deceleration may be used, for example, in eq. 1 to determine a force limit for the pitch attitude flight control surface above which the nose wheel of the aircraft is expected to lift off the ground surface or have insufficient contact force for nose wheel steering. Speed may be used, for example, to determine the nose up deflection limit that remains within the force limit.

Task 324 commands the elevator and horizontal stabilizer with a nose up command during the braking segment based on the deceleration and speed. For example, processor 210 may command the pitch attitude flight control surface with a nose up command during the braking segment in response to determining that the aircraft has entered the braking segment. The nose up command causes the pitch attitude flight control surface to generate a downforce that increases traction between the main wheels and the ground surface due to a weight shift from the nose wheel to the main wheels and directly due to the downforce on the main wheels. The deceleration and speed heavily influence whether the nose wheel lifts off of the ground surface when commanding the nose up. Task 324 bases the nose up command on the deceleration and speed to avoid lifting the nose off of the ground surface. In the example provided, task 324 ceases generating the nose up command if the nose wheel lifts off of the ground surface.

In the example provided, processor 210 commands at least one of the elevator and the horizontal stabilizer as the pitch attitude flight control surface to achieve low speed capability. For example, as aircraft 100 decelerates, elevator 118 becomes less effective. Accordingly, at low speeds processor 210 may additionally command horizontal stabilizer 116 because horizontal stabilizer 116 has a larger surface area with which to provide the downforce.

In some embodiments, processor 210 commands the pitch attitude flight control surface at a time during the braking segment that is based on a hydraulic demand of other aircraft components being manipulated during the braking segment. For example, when additional components of hydraulic system 216 are being actively manipulated, processor 210 may wait until the additional components are finished moving before commanding the nose up command. Accordingly, the peak hydraulic demand on hydraulic system 216 may be reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An avionics and flight control system for an aircraft, the aircraft having an airframe, a pitch attitude flight control surface coupled with the airframe, a nose wheel coupled with the airframe, main wheels coupled with the airframe, and a brake system operatively coupled with the main wheels, the avionics system comprising:
a processor programmed to:
determine that the aircraft has entered a braking segment of a landing phase of a flight of the aircraft while the aircraft is on a ground surface; and
command the pitch attitude flight control surface with a nose up command during the braking segment in response to determining that the aircraft has entered the braking segment,
wherein the nose up command causes the pitch attitude flight control surface to generate a downforce that increases traction between the main wheels and the ground surface due to a weight shift from the nose wheel to the main wheels and directly due to the downforce on the main wheels,
wherein the processor is further programmed to determine a nose up limit for the pitch attitude flight control surface at which the nose wheel of the aircraft is expected to lift off the ground surface or lose effectiveness for steering,
wherein the processor is programmed to command the nose up command to be less than the nose up limit to shift weight from the nose wheel of the aircraft to the main wheels without causing the nose wheel to lift off the ground surface, and
wherein the processor is programmed to cease commanding the nose up command in response to determining that the nose wheel has lifted off of the ground surface.

2. The avionics and flight control system of claim 1, wherein the processor is programmed to determine that the aircraft has entered the braking segment based on sensor outputs from a sensor system of the aircraft.

3. The avionics and flight control system of claim 2, wherein the processor is programmed to determine that the aircraft has entered the braking segment based on weight on wheels sensor data as at least part of the sensor outputs.

4. An avionics and flight control system for an aircraft, the aircraft having an airframe, a pitch attitude flight control surface coupled with the airframe, a nose wheel coupled with the airframe, main wheels coupled with the airframe, and a brake system operatively coupled with the main wheels, the avionics system comprising:
a processor programmed to:
determine that the aircraft has entered a braking segment of a landing phase of a flight of the aircraft while the aircraft is on a ground surface; and
command the pitch attitude flight control surface with a nose up command during the braking segment in response to determining that the aircraft has entered the braking segment,
wherein the nose up command causes the pitch attitude flight control surface to generate a downforce that increases traction between the main wheels and the ground surface due to a weight shift from the nose wheel to the main wheels and directly due to the downforce on the main wheels,
wherein the processor is further programmed to retrieve a maximum performance requirement status indicating increased brake system capability is available, and
wherein the processor is programmed to command the nose up command only when the maximum performance requirement status indicates maximum performance braking is available.

5. The avionics and flight control system of claim 1, wherein the aircraft includes deployable thrust reversers, wherein the processor is further programmed to retrieve the measured deceleration of the aircraft, and wherein the processor is programmed to command the nose up command only when measured deceleration is above a target threshold and the thrust reversers have not been commanded to deploy.

6. The avionics and flight control system of claim 1, wherein the processor is programmed to command at least one of an elevator and a horizontal stabilizer as the pitch attitude flight control surface.

7. The avionics and flight control system of claim 6, wherein the processor is programmed to command the at least one of the elevator and the horizontal stabilizer including commanding the horizontal stabilizer to achieve low speed capability.

8. An avionics and flight control system for an aircraft, the aircraft having an airframe, a pitch attitude flight control surface coupled with the airframe, a nose wheel coupled with the airframe, main wheels coupled with the airframe, and a brake system operatively coupled with the main wheels, the avionics system comprising:
a processor programmed to:
determine that the aircraft has entered a braking segment of a landing phase of a flight of the aircraft while the aircraft is on a ground surface; and
command the pitch attitude flight control surface with a nose up command during the braking segment in response to determining that the aircraft has entered the braking segment,
wherein the nose up command causes the pitch attitude flight control surface to generate a downforce that increases traction between the main wheels and the ground surface due to a weight shift from the nose wheel to the main wheels and directly due to the downforce on the main wheels, and
wherein the processor is programmed to command the pitch attitude flight control surface at a time during the braking segment that is based on a hydraulic demand of at least one component of a hydraulic system being manipulated during the braking segment.

9. An aircraft, comprising:
an airframe;
a pitch attitude flight control surface coupled with the airframe;
main wheels coupled with the airframe;
a nose wheel coupled with the airframe;
a brake system operatively coupled with the main wheels; and a processor programmed to:
　determine that the aircraft has entered a braking segment of a landing phase of a flight of the aircraft while the aircraft is on a ground surface; and
　command the pitch attitude flight control surface with a nose up command during the braking segment in response to determining that the aircraft has entered the braking segment,
wherein the nose up command causes the pitch attitude flight control surface to generate a downforce that increases traction between the main wheels and the ground surface due to a weight shift from the nose wheel to the main wheels and directly due to the downforce on the main wheels,
wherein the processor is further programmed to retrieve a maximum performance requirement status indicating increased brake system capability is available, and
wherein the processor is programmed to command the nose up command only when the maximum performance requirement status indicates maximum performance braking is available.

10. The aircraft of claim 9, further comprising a sensor system configured to detect whether the aircraft is on the ground surface and to generate sensor outputs, and wherein the processor is programmed to determine that the aircraft has entered the braking segment based on the sensor outputs.

11. The aircraft of claim 10, wherein the sensor system includes a weight on wheels sensor configured to generate weight on wheels sensor data, and wherein the processor is programmed to determine that the aircraft has entered the braking segment based on the weight on wheels sensor data.

12. An aircraft, comprising:
　an airframe;
　a pitch attitude flight control surface coupled with the airframe;
　main wheels coupled with the airframe;
　a nose wheel coupled with the airframe;
　a brake system operatively coupled with the main wheels; and
　a processor programmed to:
　　determine that the aircraft has entered a braking segment of a landing phase of a flight of the aircraft while the aircraft is on a ground surface; and
　　command the pitch attitude flight control surface with a nose up command during the braking segment in response to determining that the aircraft has entered the braking segment,
　wherein the nose up command causes the pitch attitude flight control surface to generate a downforce that increases traction between the main wheels and the ground surface due to a weight shift from the nose wheel to the main wheels and directly due to the downforce on the main wheels,
　wherein the processor is further programmed to determine a nose up limit for the pitch attitude flight control surface at which the nose wheel is expected to lift off the ground surface, and wherein the processor is programmed to command the nose up command to be less than the nose up limit to shift weight from the nose wheel to the main wheels without causing the nose wheel to lift off the ground surface.

13. The aircraft of claim 9, wherein the aircraft includes deployable thrust reversers, wherein the processor is further programmed to retrieve the measured deceleration of the aircraft, and wherein the processor is programmed to command the nose up command only when measured deceleration is above a target threshold and the thrust reversers have not been commanded to deploy.

14. The aircraft of claim 9, wherein the pitch attitude flight control surface is one of an elevator and a horizontal stabilizer.

15. The aircraft of claim 14, wherein the processor is programmed to command one of the elevator and the horizontal stabilizer by commanding the horizontal stabilizer to achieve low speed capability.

16. The aircraft of claim 9, wherein the processor is programmed to command the pitch attitude flight control surface at a time during the braking segment that is based on a hydraulic demand of at least one component of a hydraulic system being manipulated during the braking segment.

17. A method of increasing braking traction during a braking segment of a landing phase of a flight of an aircraft, the method comprising:
　determining that the aircraft has entered the braking segment of the landing phase of the flight while the aircraft is on a ground surface; and
　commanding a pitch attitude flight control surface of the aircraft with a nose up command during the braking segment in response to determining that the aircraft has entered the braking segment,
　wherein the nose up command causes the pitch attitude flight control surface to generate a downforce that increases traction between main wheels of the aircraft and the ground surface due to a weight shift from a nose wheel of the aircraft to the main wheels and directly due to the downforce on the main wheels,
　wherein the aircraft includes deployable thrust reversers,
　wherein the processor is further programmed to retrieve the measured deceleration of the aircraft, and
　wherein the processor is programmed to command the nose up command only when measured deceleration is above a target threshold and the thrust reversers have not been commanded to deploy.

* * * * *